No. 787,578. PATENTED APR. 18, 1905.
F. LAMBERT.
CAP NUT.
APPLICATION FILED JUNE 21, 1902.
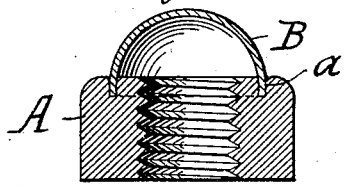
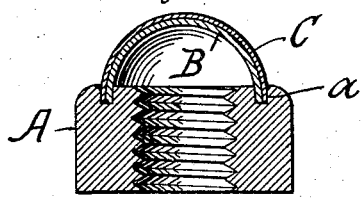
Witnesses:
Mabelle F. Lake
E. S. Chickman
Inventor:
Frank Lambert
By Edith J. Griswold
atty.

No. 787,578.

Patented April 18, 1905.

UNITED STATES PATENT OFFICE.

FRANK LAMBERT, OF BROOKLYN, NEW YORK.

CAP-NUT.

SPECIFICATION forming part of Letters Patent No. 787,578, dated April 18, 1905.

Application filed June 21, 1902. Serial No. 112,582.

*To all whom it may concern:*

Be it known that I, FRANK LAMBERT, a citizen of the United States, and a resident of New York city, borough of Brooklyn, Kings county, State of New York, have invented a Cap-Nut, of which the following is a specification.

This invention relates to nuts for bolts, &c., and has for its object to construct an efficient cap-nut that may be manufactured at a very low cost.

When exposed to the atmosphere or water, bolts with cap-nuts are preferable to open nuts, as corrosion along the thread between the bolt and the nut is prevented. Open nuts are easily manufactured; but cap-nuts in one piece are more expensive, as they require more costly operations, and much material is wasted in their manufacture. Where bolt-nuts are used in places exposed to the atmosphere or water, the effect is that the few threads of the bolt that may project out beyond the nut soon become corroded, which renders the removal of the nut very difficult, if not impossible. Cap-nuts are more ornamental and permit of the machine being kept clean more easily. When open nuts are used and some of the threads of the bolt project out beyond the nut, these threads catch the dust and oil, which is difficultly removed. Another advantage of the use of cap-nuts is that the length of the bolt does not need to be so closely calculated—that is, to make the bolt end come flush with the nut—since when a cap-nut is screwed down it hides the end of the bolt, and it does not make any difference whether the bolt is a couple of threads longer or shorter.

By my present invention I take a common open nut, form a groove in its top surrounding the opening, and insert in the groove an independent cap, thereby producing an efficient cap-nut at a low cost.

While nuts are generally made of metal—such as brass, steel, or iron—according to my invention the caps can be of different material than the nut, according to the use to which the nut is to be applied. For cheapness an iron cap can be used, and for fancy nuts, where appearance is a matter of concern, a cap (or covering for the cap) of brass, celluloid, hard rubber, or other material can be used equally as well.

In the accompanying drawings, Figure 1 is a central sectional elevation of an open nut adapted to have an independent cap secured thereto in a convenient manner, and Fig. 2 is a similar view showing the cap attached. Fig. 3 is a view similar to Fig. 2, showing a modification.

Referring to Figs. 1 and 2, the nut A is provided with a circular groove *a* in its top, adapted to receive the rim of a hollow spherical cup or other-shaped cap B. When said cap is in place, the metal of the nut A around the cap may be pressed to hold firmly the cap B to the nut. To make a water-tight joint between the open nut and its cap, preferably the metal of the nut is set all around the cap, or the cap B may be soldered or otherwise secured in the groove *a* of nut A. With the common cap-nut in one piece it is very difficult to tap the nut with a full thread to the end of the hole, so as to permit the bolt going as far as the cap portion, except when the hole is chambered to give a clearance for the tap, which is also a difficult and costly operation. Consequently the common cap-nut is generally made deeper than is necessary, so that the bolt may go far enough in without the threads of the nut and screw jamming. Thus a greater amount of metal is necessary for the common cap-nut than for my improved cap-nut.

Fig. 3 represents a cap-nut like that shown in Fig. 2, having a coating or thin outer cap C over the cap B, secured to the nut with the cap. This external cap E may be made of any thin material for ornamental purposes, while the rigidity will be given by the internal cap B.

It will be seen that with the construction shown the metal or material forming the cap can be made very thin, as there is no tendency to contract the cap when the metal of the nut is forced against it to secure it in position.

Various other forms or shapes of caps or nuts may be used without departing from my invention.

I claim as my invention—

1. A cap-nut comprising an open nut having a groove in its top beyond and surrounding the opening, and a hollow cap the rim of which is held in said groove, the metal of the nut coming against each side of said rim.

2. A cap-nut comprising an open nut having a groove in its top beyond and surrounding the opening, an external and an internal cap, hollowed and having their rims inserted in the said groove as one cap for the nut, the metal of the nut outside the groove being pressed around the external cap, and the metal of the nut at the inner side of the groove supporting the caps at the inside of their rims.

In testimony whereof I have signed my name to this specification in the presence of two subscribing witnesses.

FRANK LAMBERT.

Witnesses:
    EDITH J. GRISWOLD,
    MABELLE F. LAKE.